US011371658B2

(12) United States Patent
Gambone et al.

(10) Patent No.: US 11,371,658 B2
(45) Date of Patent: Jun. 28, 2022

(54) PRESSURIZED VESSEL HEAT SHIELD AND THERMAL PRESSURE RELIEF SYSTEM

(71) Applicant: Nikola Corporation, Phoenix, AZ (US)

(72) Inventors: Livio Richard Gambone, Phoenix, AZ (US); David Leigh Grottenhaler, Phoenix, AZ (US); Jesse Michael Schneider, Chandler, AZ (US)

(73) Assignee: Nikola Corporation, Phoenix, AZ (US)

( * ) Notice: Subject to any disclaimer, the term of this patent is extended or adjusted under 35 U.S.C. 154(b) by 0 days.

(21) Appl. No.: 16/944,641

(22) Filed: Jul. 31, 2020

(65) Prior Publication Data

US 2020/0363016 A1    Nov. 19, 2020

Related U.S. Application Data

(63) Continuation of application No. PCT/US2020/022165, filed on Mar. 11, 2020.
(Continued)

(51) Int. Cl.
  *F17C 13/04* (2006.01)
  *B60L 58/32* (2019.01)
  *F17C 13/02* (2006.01)

(52) U.S. Cl.
  CPC .............. *F17C 13/04* (2013.01); *B60L 58/32* (2019.02); *F17C 13/026* (2013.01);
  (Continued)

(58) Field of Classification Search
  CPC .............. B60L 58/32; F17C 2270/0184; F17C 2201/0109; F17C 2201/035;
  (Continued)

(56) References Cited

U.S. PATENT DOCUMENTS

| | | | | | |
|---|---|---|---|---|---|
| 2,891,475 A | * | 6/1959 | Dolan | ...................... | C06C 5/04 |
| | | | | | 102/275.8 |
| 2,982,210 A | * | 5/1961 | Andrew | .................... | C06C 5/00 |
| | | | | | 102/275.8 |

(Continued)

FOREIGN PATENT DOCUMENTS

| | | | | |
|---|---|---|---|---|
| DE | | 2919896 A1 * | 11/1980 | ............. A62C 37/14 |
| DE | 102011114722 | | 4/2013 | |

(Continued)

OTHER PUBLICATIONS

PCT; International Search Report and Written Opinion in PCT Application No. PCT/US20/22165 dated Jun. 11, 2020.
(Continued)

*Primary Examiner* — Kenneth Rinehart
*Assistant Examiner* — James R Hakomaki
(74) *Attorney, Agent, or Firm* — Snell & Wilmer L.L.P.

(57) ABSTRACT

A pressure relief system comprises a pressurized vessel containing a fuel source and comprising a thermal pressure relief device, a heat shield coating disposed on an outer surface of the pressurized vessel, a sensor in thermal communication with the heat shield and configured to receive thermal energy from the heat shield, and an electronic control module electrically coupled to the sensor and the thermal pressure relief device. The sensor, responsive to receiving a threshold amount of thermal energy from the heat shield coating, may transmit a signal to the electronic control module. The electronic control module may activate the thermal pressure relief device in response to the signal.

10 Claims, 6 Drawing Sheets

Related U.S. Application Data (60) Provisional application No. 62/817,363, filed on Mar. 12, 2019.

(52) U.S. Cl.
CPC ............ *F17C 2205/0326* (2013.01); *F17C 2205/0332* (2013.01); *F17C 2221/012* (2013.01); *F17C 2223/0123* (2013.01); *F17C 2260/023* (2013.01); *F17C 2270/0184* (2013.01)

(58) Field of Classification Search
CPC .......... F17C 2201/056; F17C 2201/058; F17C 2223/036; F17C 2221/033; F17C 2201/0128; F17C 2201/0157; F17C 2205/0335; F17C 13/04; F17C 13/026; F17C 2205/0326; F17C 2205/0332; F17C 2221/012; F17C 2223/0123; F17C 2260/023; F17C 2205/035; F17C 2205/013; F17C 2250/0439; F17C 2250/032; F17C 2250/034; G05D 9/12; Y02E 60/32; Y02T 90/40
USPC .......................................................... 141/21
See application file for complete search history.

(56) References Cited

U.S. PATENT DOCUMENTS

| | | | | |
|---|---|---|---|---|
| 3,320,882 A * | 5/1967 | Schulz | ............... | C06C 5/04 102/275.8 |
| 3,656,585 A * | 4/1972 | Andrews | ............... | G01V 1/13 102/314 |
| 4,085,860 A * | 4/1978 | Hawkins | ............... | F16K 17/40 220/89.4 |
| 4,142,927 A * | 3/1979 | Walker | ............... | C06B 23/005 149/105 |
| 4,232,606 A * | 11/1980 | Yunan | ............... | C06C 5/08 102/275.8 |
| 4,290,366 A * | 9/1981 | Janoski | ............... | C06C 5/04 102/202.3 |
| 4,488,486 A * | 12/1984 | Betts | ............... | F42B 3/10 102/275.1 |
| 4,638,107 A * | 1/1987 | Davis | ............... | G01K 7/00 136/237 |
| 4,991,511 A * | 2/1991 | Simpson | ............... | C06C 5/04 102/275.1 |
| 5,255,809 A * | 10/1993 | Ervin | ............... | F17C 13/123 137/843 |
| 5,375,525 A * | 12/1994 | Greenslade | ............... | F42C 15/188 102/275.12 |
| 5,848,694 A * | 12/1998 | Newton | ............... | B25H 3/003 206/373 |
| 6,170,398 B1 * | 1/2001 | Rabotinsky | ............... | C06C 5/04 102/275.9 |
| 6,247,410 B1 * | 6/2001 | Garcia | ............... | C06B 25/34 102/275.9 |
| 6,257,360 B1 * | 7/2001 | Wozniak | ............... | F17C 1/02 180/69.5 |
| 6,382,232 B1 * | 5/2002 | Portmann | ............... | F16K 13/06 102/275.1 |
| 6,612,243 B1 * | 9/2003 | Italiane | ............... | A62C 13/22 102/367 |
| 6,670,291 B1 * | 12/2003 | Tompkins | ............... | B32B 27/12 428/920 |
| 6,694,886 B1 * | 2/2004 | Woodall | ............... | F42D 3/00 102/275.1 |
| 7,337,799 B2 * | 3/2008 | Delfino | ............... | F17C 13/123 137/79 |
| 7,721,750 B2 * | 5/2010 | Lindner | ............... | F24V 30/00 137/72 |
| 7,799,428 B2 * | 9/2010 | Fujiwara | ............... | G06F 1/203 428/408 |
| 8,038,029 B2 * | 10/2011 | Lindner | ............... | B29C 70/32 220/588 |
| 8,096,708 B2 * | 1/2012 | Harrington | ............... | G01K 3/005 374/179 |
| 8,382,004 B2 * | 2/2013 | Asmussen | ............... | H05B 3/267 237/69 |
| 8,627,841 B2 * | 1/2014 | Hirakata | ............... | F17C 13/025 137/80 |
| 9,174,531 B2 * | 11/2015 | Finck | ............... | B60K 15/03006 |
| 9,272,169 B2 * | 3/2016 | Ono | ............... | B32B 9/046 |
| 9,574,947 B2 | 2/2017 | Cole et al. | | |
| 9,660,308 B2 * | 5/2017 | Guignard | ............... | H01M 50/20 |
| 9,962,568 B2 * | 5/2018 | Taniguchi | ............... | A62C 35/00 |
| 9,988,160 B1 * | 6/2018 | Clos | ............... | B64D 45/00 |
| 10,677,576 B1 * | 6/2020 | Hansen | ............... | F42B 39/14 |
| 2002/0171236 A1 * | 11/2002 | Joitescu | ............... | F17C 1/00 280/834 |
| 2004/0163731 A1 * | 8/2004 | Eichelberger | ............... | F17C 5/06 141/284 |
| 2004/0188435 A1 * | 9/2004 | Fenton | ............... | B64D 37/32 220/6 |
| 2006/0061081 A1 * | 3/2006 | Kresse, Jr. | ............... | B60K 15/07 280/834 |
| 2007/0238008 A1 * | 10/2007 | Hogan | ............... | B60R 13/08 219/458.1 |
| 2008/0066805 A1 * | 3/2008 | Winter | ............... | F17C 1/00 137/68.12 |
| 2008/0101026 A1 * | 5/2008 | Ali | ............... | H05K 7/20518 361/708 |
| 2011/0023449 A1 * | 2/2011 | Loehr | ............... | F02K 9/26 60/219 |
| 2011/0079403 A1 | 4/2011 | Lee et al. | | |
| 2011/0127263 A1 * | 6/2011 | Lee | ............... | F17C 13/12 220/89.2 |
| 2012/0011843 A1 * | 1/2012 | Makinson | ............... | F17C 13/12 60/527 |
| 2012/0318403 A1 * | 12/2012 | Cohen | ............... | F17C 7/02 141/3 |
| 2014/0050886 A1 * | 2/2014 | Burgin | ............... | B29D 99/0021 442/374 |
| 2014/0053921 A1 * | 2/2014 | Risse | ............... | F16K 1/307 137/468 |
| 2014/0109974 A1 * | 4/2014 | Zoz | ............... | F17C 7/00 137/1 |
| 2014/0220469 A1 | 8/2014 | Heise | | |
| 2016/0033085 A1 | 2/2016 | Sirosh et al. | | |
| 2017/0042058 A1 * | 2/2017 | Pope | ............... | H01L 23/3735 |
| 2017/0167662 A1 * | 6/2017 | Schwartz | ............... | B60K 15/03006 |
| 2017/0234487 A1 * | 8/2017 | Shima | ............... | F17C 3/04 220/1.5 |
| 2018/0226699 A1 * | 8/2018 | Piggott | ............... | H01M 10/625 |
| 2018/0283610 A1 * | 10/2018 | Wexler | ............... | B60K 15/03006 |
| 2019/0226641 A1 * | 7/2019 | Ogiwara | ............... | F17C 13/12 |
| 2020/0036065 A1 * | 1/2020 | Wang | ............... | H01M 50/183 |
| 2020/0091840 A1 * | 3/2020 | Dhyllon | ............... | H01L 35/30 |
| 2020/0180417 A1 * | 6/2020 | Marquez Duran | ............... | H01M 10/6556 |
| 2020/0191335 A1 * | 6/2020 | Kataoka | ............... | F17C 13/123 |
| 2020/0198458 A1 * | 6/2020 | Volkmer | ............... | B60K 15/035 |
| 2020/0256518 A1 * | 8/2020 | Adler | ............... | F17C 13/12 |

FOREIGN PATENT DOCUMENTS

| | | | | |
|---|---|---|---|---|
| DE | 102011114725 A1 * | 4/2013 | ............... | F17C 13/04 |
| DE | 102013016036 A1 | 3/2015 | | |
| DE | 102013220421 | 4/2015 | | |
| DE | 102017209190 | 12/2018 | | |
| DE | 102018202742 A1 * | 8/2019 | ............... | F17C 1/00 |

OTHER PUBLICATIONS

European Patent Office; Extended European Search Report dated Feb. 2, 2022 in Application No. 20770415.6.

(56) References Cited

OTHER PUBLICATIONS

PCT; International Preliminary Report on Patentability dated Jun. 11, 2020 in Application No. PCT/US2020/022165.

* cited by examiner

PRESSURIZED VESSEL HEAT SHIELD AND THERMAL PRESSURE RELIEF SYSTEM

CROSS-REFERENCE TO RELATED APPLICATIONS

This application is a continuation of PCT Serial No. PCT/US2020/022165 filed on Mar. 11, 2020 entitled "Pressurized Vessel Heat Shield and Thermal Pressure Relief System." PCT Serial No. PCT/US2020/022165 claims priority to and the benefit of U.S. Provisional Application No. 62/817,363 filed on Mar. 12, 2019 entitled "Pressurized Vessel Heat Shield and Thermal Pressure Relief System." The foregoing applications are hereby incorporated by reference in their entirety (except for any subject matter disclaimers or disavowals, and except to the extent of any conflict with the disclosure of the present application, in which case the disclosure of the present application shall control).

TECHNICAL FIELD

The present disclosure relates to pressurized vessels, and more particularly, to heat shields and thermal pressure relief devices for pressurized fuel vessels of electrically powered vehicles.

BACKGROUND

Vehicle fires are a known in-service stressor and safety consideration for gaseous fuel vehicle pressure vessels, for example, hydrogen-powered fuel cell vehicles. When a pressurized vehicle vessel is exposed to excessive heat arising from a vehicle fire, the vessel materials may begin to degrade and the temperature and pressure within the vessel may begin to increase. Conventional vessels may be protected from rupture via one or more pressure relief devices (PRDs) that release the fuel source (e.g., compressed hydrogen gas) from the vessel via a thermally actuated mechanism, such as one consisting of a low melting point eutectic, fluid-filled glass bulb or shape memory alloy. However, conventional PRDs may only offer point-source fire protection for the vessel because the PRDs are typically mounted to discrete locations on the vessel, such as the endpoints or midsection. As a result, large areas of the vessel may be exposed to high heat conditions, and therefore the vessel may be at a risk of rupturing, without activation of the PRDs.

SUMMARY

A pressure relief system may comprise a first pressurized vessel containing a fuel source and comprising a thermal pressure relief device, a heat shield positioned adjacent to the first pressurized vessel, and a sensor coupled to at least one of the first pressurized vessel or the heat shield and configured to measure a temperature of the first pressurized vessel or the heat shield, wherein at least one of the first pressurized vessel or heat shield comprise a material having a relatively low through-plane thermal conductivity and a relatively high in-plane thermal conductivity, wherein the material is configured to conduct heat to the sensor and activate the thermal pressure relief device in response to a measured temperature being greater than a threshold temperature.

In various embodiments, the heat shield may comprise a first layer configured to conduct thermal energy in a direction corresponding to a length of the heat shield. The heat shield may further comprise a second layer configured to reduce thermal energy in a direction normal to the length of the heat shield. The heat shield may be adjacent to the first pressurized vessel. The thermal pressure relief device may comprise an electrically-activated thermal pressure relief device. The thermal pressure relief device may comprise a pilot-activated thermal pressure relief device. The sensor may be in electrical communication with an electronic control module configured to activate the thermal pressure relief device in response to the measured temperature being greater than the threshold temperature. The electronic control module may notify a vehicle operator in the event the measured temperature is greater than the threshold temperature. The pressure relief system may further comprise a second pressurized vessel in proximity to the first pressurized vessel. The first pressurized vessel and the second pressurized vessel may be in communication such that in response to the first pressurized vessel relieving pressure, the second pressurized vessel relieves pressure. The first pressurized vessel and the second pressurized vessel may relieve pressure simultaneously. The second pressurized vessel may relieve pressure after the first pressurized vessel. The first layer may comprise a material different from a material of the second layer. The pressure relief system may form a portion of a hydrogen fuel cell vehicle. The sensor may comprise a nickel-alloy thermocouple, a platinum/rhodium-alloy thermocouple, or a tungsten/rhenium-alloy thermocouple. The heat shield may be positioned between the first pressurized vessel and a battery. The thermal pressure relief device may be activated via a smart material or shape memory alloy.

A pressure relief system may comprise a pressurized vessel containing a fuel source and comprising a thermal pressure relief device, a heat shield coating disposed on an outer surface of the pressurized vessel, a sensor in thermal communication with the heat shield and configured to receive thermal energy from the heat shield, and an electronic control module electrically coupled to the sensor and the thermal pressure relief device, wherein the sensor, responsive to receiving a threshold amount of thermal energy from the heat shield coating, transmits a signal to the electronic control module, and wherein the electronic control module activates the thermal pressure relief device in response to the signal.

A method for relieving pressure from a pressurized vessel may comprise insulating the pressurized vessel from a heat source, conducting a thermal load associated with the heat source to a sensor, measuring a thermal load temperature associated with the thermal load, comparing the thermal load temperature to a threshold temperature, and relieving pressure from the pressurized vessel in response to the thermal load temperature being greater than the threshold temperature.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with electric vehicles, fuel-cell electric vehicles, compressed natural gas vehicles, hythane (mix of hydrogen and natural gas) vehicles, and/or the like. However, various aspects of the disclosed embodiments may be adapted for performance in a variety of other systems. As such, numerous applications of the present disclosure may be realized.

Certain electric vehicles, such as hydrogen-powered fuel cell vehicles, may utilize a pressurized gaseous fuel source, such as hydrogen, which may be used as an input to a fuel cell and thus to power one or more electric motors. Typically, the pressurized gaseous fuel source may be stored under pressure in a pressurized vessel or tank in order to increase the amount of gas able to be stored in the pressurized vessel and to create a pressure gradient for downstream components such as fuel cells. The pressurized nature and the flammability of the gaseous fuel source may pose an extreme safety hazard in the event the pressurized vessel is exposed to a flame, which may increase the pressure within the vessel and/or decrease the structural integrity of the vessel and potentially lead to ruptures. As a result, pressurized vessels often contain one or more PRDs configured to relieve excess pressure (by, for example, venting a portion or all of the gas in the vessel) in the pressurized vessel and prevent the pressurized vessel from rupturing.

Conventionally, PRDs may be mounted on pressurized vessels at discrete locations, such as the endpoints or midsection thereof, and activated via a thermally-actuated mechanism. However, conventional PRDs may only be activated in the event the heat source is located in close proximity to the PRDs. Accordingly, benefits may be realized by utilizing a system whereby thermally-activated PRDs may be activated to relieve pressure in the pressurized vessel regardless of the location of the heat source relative to the pressurized vessel and/or the PRDs.

Figure 1A:
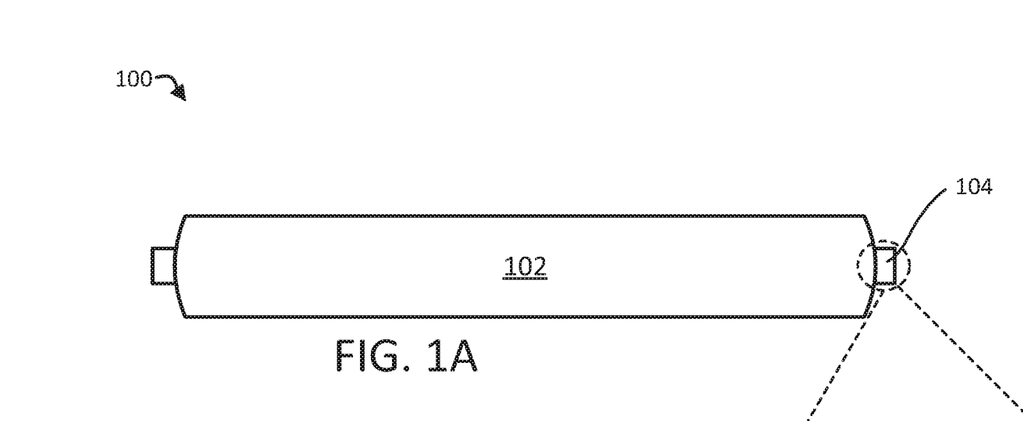
FIGS. 1A, 1B, and 1C illustrate a pressurized vessel and two types of pressure relief devices for a pressurized vessel, in accordance with various embodiments.

Accordingly, with reference to FIG. 1A, a pressurized vessel system 100 is illustrated, in accordance with various embodiments. Pressurized vessel system 100 may comprise a pressurized vessel 102, equipped with one or more valves 104, in various embodiments. As previously stated, pressurized vessel 102 may be configured to contain a gaseous (and/or liquid) fuel source, such as hydrogen, and distribute the gaseous fuel source to one or more components of an electric vehicle through valves 104. The one or more valves 104 may be equipped with a thermally-activated PRD, in various embodiments. Pressurized vessel 102 may comprise any suitable structure for containing a fuel supply (e.g., gaseous hydrogen) at relatively high pressure and for delivering the fuel supply to downstream components. Pressurized vessel 102 may comprise a Type 1, Type 2, Type 3, or Type 4 pressure vessel, for example. Further, pressurized vessel 102 may comprise any suitable shape such as a spherical shape, cylindrical shape, rectangular shape with rounded corners, or other shape. As would be appreciated, valves 104 may comprise passive or active valve systems. For example, in various embodiments, valves 104 may comprise ball valves, check valves, flow control valves, solenoid valves, or a combination thereof to controllably allow, limit, and/or prevent flow of gaseous or liquid fuel to components downstream of pressurized vessel 102 (for example, one or more hydrogen fuel cell stacks). Valves 104 may also be equipped with a thermal pressure relief device as will be discussed further below.

Figure 1B:
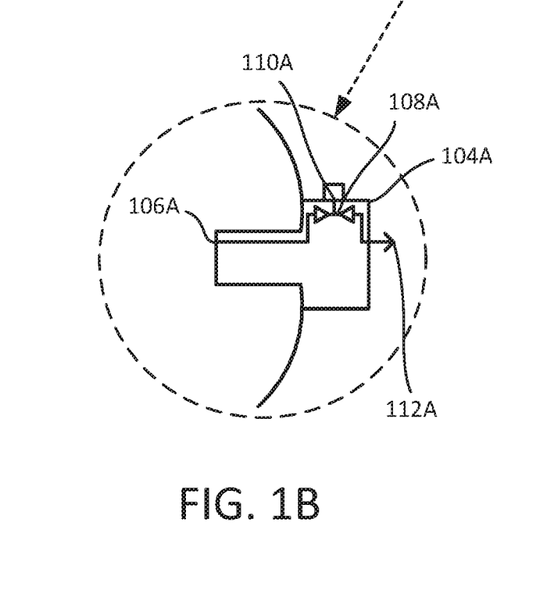
Figure 1C:
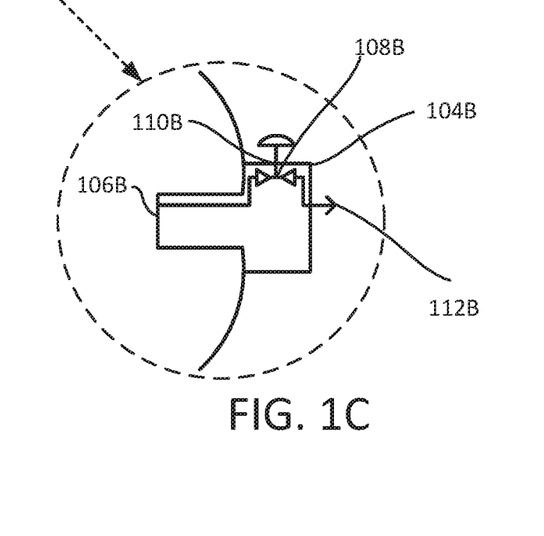

With reference to FIG. 1B and FIG. 1C, a valve 104 may comprise an electrically-activated thermal pressure relief device (TPRD) 104A or a pilot-activated TPRD 104B, however, valve 104 is not limited in this regard and may comprise any suitable pressure relief device. In various embodiments, electrically-activated TPRD 104A may comprise an inlet 106A in fluid communication with internal contents of the pressurized vessel 102, an electrically-actuated valve 108A in fluid communication with the inlet 106A, a relief port 110A in fluid communication with electrically-actuated valve 108A, and an outlet 112A in fluid communication with the relief port 110A. Electrically-actuated valve 108A may receive an electrical signal from an electronic control module (ECM) as further set forth below, and may open relief port 110A to bleed gaseous fuel from pressurized vessel 102. In various embodiments, electrically-actuated valve 108A may receive an electrical signal generated by a thermoelectric material which may convert differences in temperature to generate electricity to activate (and/or comprise a signal configured to activate) electrically-actuated valve 108A. Outlet 112A may be in fluid communication with downstream components configured to receive contents of pressurized vessel 102.

Additionally or alternatively, pilot-activated TPRD 104B may comprise an inlet 106B in fluid communication with internal contents of the pressurized vessel 102, a poppet and spring device 108B, a relief port 110B, and an outlet 112B. As would be appreciated by one of ordinary skill in the art, pilot-activated TPRD 104B may be configured to receive gaseous fuel from pressurized vessel 102 through inlet 106B. The pilot-activated TPRD 104B may be actuated by a remote pneumatic or hydraulic signal, for example arising from a thermal input. Additionally or alternatively, electrically-activated TPRD 104A and/or pilot-activated TPRD 104B may be activated via a signal from the ECM as further set forth below.

Figure 2:
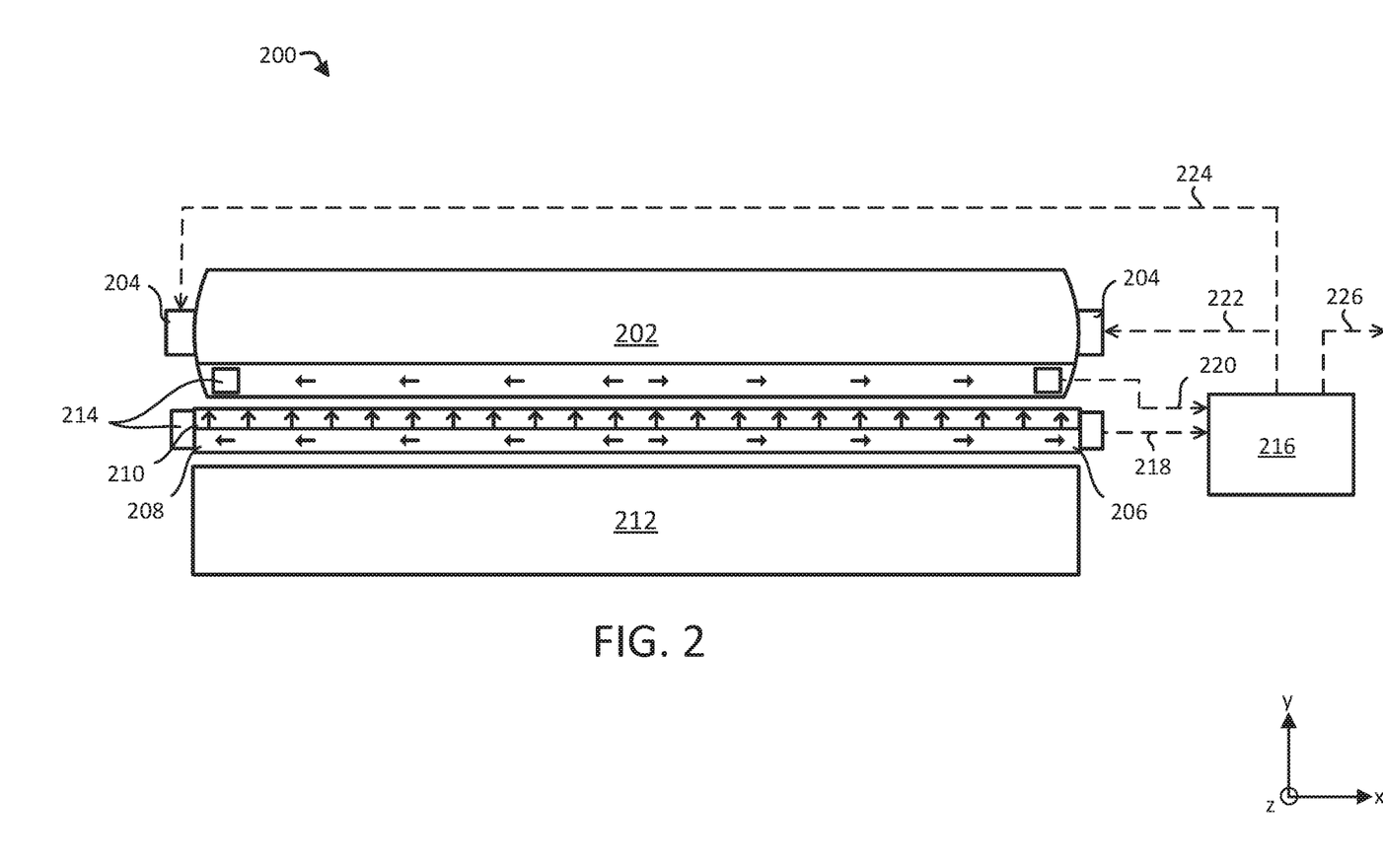
FIG. 2 illustrates a vessel heat shield and pressure relief system for a pressurized vessel, in accordance with various embodiments.

With reference now to FIG. 2, a vessel heat shield and pressure relief system 200 may be configured to detect a heat source such as a flame via a remote detection method and activate a TPRD 204, such as an electrically-activated TPRD or a pilot-activated TPRD, similar to those discussed in relation to FIG. 1B and FIG. 1C. Specifically, vessel heat shield and pressure relief system 200 may comprise a heat shield 206 disposed substantially parallel to and adjacent to (and/or disposed on at least a portion of an outer surface of) a pressurized vessel 202, which may comprise a pressurized gaseous fuel vessel. While illustrated as being situated substantially parallel and adjacent to pressurized vessel 202, heat shield 206 is not limited in this regard. For example, it should be appreciated that heat shield 206 and pressurized vessel 202 may be oriented in any suitable spatial relationship. For example, in various embodiments, heat shield 206 may completely encapsulate pressurized vessel 202 on all sides or surfaces to provide maximum protection to pressurized vessel 202.

In various embodiments, heat shield 206 may comprise a first layer 208 and a second layer 210 adjacent to the first layer 208, however, heat shield 206 is not limited in this regard and may comprise a single layer, two layers, three layers, and/or more layers, as suitable. Moreover, layer(s) of heat shield 206 may differ from one another in material, thickness, method of application, and/or the like. Heat shield 206 may comprise any suitable structure configured to provide a low degree of thermal conductivity in a first direction (for example, a direction substantially normal to an axial length of pressurized vessel 202) and a high degree of thermal conductivity in a second direction (for example, a direction substantially along the axial length of pressurized vessel 202). Specifically, heat shield 206 may comprise a structure configured to provide low through-plane thermal conductivity and high in-plane thermal conductivity. For example, in various embodiments, heat shield 206 may be configured to provide a low degree of thermal conductivity in the y-direction yet a high degree of thermal conductivity in the x-direction. In various embodiments, as indicated by the axes of FIG. 2, the x-direction represents the lengthwise dimension of pressurized vessel 202, and the y-direction represents the radial dimension of pressurized vessel 202. Heat shield 206 may, for example, be configured to conduct heat along a planar surface defined by heat shield 206 yet insulate pressurized vessel 202 from thermal energy through heat shield 206. In various embodiments, heat shield 206 may be situated between a battery system 212 and pressurized vessel 202. As will be discussed further below, in response to a flame impinging on (or directing heat onto) a surface of heat shield 206 (for example, due to a fire from battery system 212), heat shield 206 may be configured to conduct heat to one or more sensors 214, thereby signaling the need to relieve pressure from pressurized vessel 202 through TPRDs associated with valve(s) 204.

In various exemplary embodiments, heat shield 206 may comprise an anisotropic coating, layer, series of layers, or other suitable structure (such as strips of metal, carbon fiber, ceramics, and/or the like). All such exemplary materials, together with construction approaches for heat shield 206 whereby materials, coatings, sprays, layers, and/or the like are operative, either individually or in combination with one another, to provider greater thermal conductivity in a first direction (typically, an in-plane direction of heat shield 206) than in a second direction (typically, a through-plane direction for heat shield 206) are considered to be within the scope of the present disclosure. In various embodiments, heat shield 206 may further comprise one or more air gaps situated between the one or more coatings or layers. Air gaps may be configured to reduce convective heat transfer generated from the heat source impinging on heat shield 206. Therefore, in various embodiments heat shield 206 is configured to insulate pressurized vessel 202 from thermal energy transferred by conduction as well as by convection.

In various embodiments, heat shield 206 may comprise any suitable material. For example, heat shield 206 may comprise a metallic base material such as a 300 series stainless steel or similar material. As previously stated, heat shield 206 may comprise a first layer 208 and a second layer 210. As such, in various embodiments, heat shield 206 may comprise a composite material with first layer 208 comprising a directional thermally conductive anisotropic coating or a deposited material such as copper, silver, or aluminum and second layer 210 comprising a non-organic, non-flammable, high-temperature, lightweight insulating material. First layer 208 may be configured to conduct heat along a surface of heat shield 206 in the x-direction, while second layer 210 may be configured to insulate pressurized vessel 202 from thermal energy through heat shield 206 in the y-direction. First layer 208 may comprise a coefficient of thermal conductivity of between approximately 100-400 W/m-K, between approximately 150-350 W/m-K, or between approximately 200-300 W/m-K. Second layer 210 may comprise a coefficient of thermal conductivity of between approximately 0-0.25 W/m-K, between approximately 0.05-0.20 W/m-K, or between approximately 0.10-0.015 W/m-K.

An exterior surface of pressurized vessel 202 may also comprise one or more layers of an insulating and/or conductive material, in various embodiments. For example, similar to heat shield 206, the exterior surface of pressurized vessel 202 may comprise or be coated with one or more layers of a material having a low degree of thermal conductivity in the y-direction and a high degree of thermal conductivity in the x-direction. Specifically, pressurized vessel 202 may be coated with an anisotropic thermal coating. As a result, pressurized vessel 202 may be configured to insulate contents of the pressurized vessel 202 from an external heat source and conduct at least a portion of such heat along a surface of pressurized vessel 202.

In various embodiments, pressurized vessel 202 and/or heat shield 206 may be equipped with one or more sensors 214. Sensors 214 may comprise a thermocouple such as a nickel-alloy thermocouple, platinum/rhodium-alloy thermocouple, tungsten/rhenium-alloy thermocouple, or other type of thermocouple. While discussed above as comprising electrical thermocouples, sensors 214 are not limited in this regard and may comprise any suitable sensor capable of measuring and reacting to changes in temperature. For example, in various embodiments, sensors 214 may include mechanical, electrical, and/or semiconductor sensor(s), for example, thermometers, bimetallic strips, integrated circuit temperature sensors, and/or the like. In various embodiments, sensors 214 may be coupled to pressurized vessel 202 and/or heat shield 206 at the terminal ends thereof, however, sensors 214 are not limited in this regard and may be coupled to any other portion of pressurized vessel 202 and/or heat shield 206. For example, while illustrated in FIG. 2 as comprising four sensors 214, with two on pressurized vessel 202 and two on heat shield 206, vessel heat shield and pressure relief system 200 is not limited in this regard and pressurized vessel 202 and heat shield 206 may comprise any suitable number of sensors 214. Specifically, FIG. 2 illustrates two sensors 214 located proximal to the terminal ends and near a bottom of pressurized vessel 202. FIG. 2 further illustrates two additional sensors 214 located proximal to the terminal ends of heat shield 206. However, the locations and numbers of sensors 214 on pressurized vessel 202 and heat shield 206 are not limited in this regard and pressurized vessel 202 and heat shield 206 may comprise more sensors 214 or fewer sensors 214 at different locations.

For example, in various embodiments, sensors 214 may be spaced axially (in the x-direction) along the length of pressurized vessel 202 and/or heat shield 206, and/or circumferentially (about the x-axis) on a radially outer surface of pressurized vessel 202. The spacing between sensors 214 may be equal or may vary. A single axial point on pressurized vessel 202 may have one or multiple sensors 214 along a radially outer surface of the pressurized vessel 202. In various embodiments, sensors 214 may be arranged in a helical shape around pressurized vessel 202. Sensors 214 may be positioned on a first side of heat shield 206 (proximal to battery system 212) and/or on a second side of heat shield 206 (proximal to pressurized vessel 202). Moreover, a number of sensors 214 may be selected for use, and sensors 214 may be disposed on pressurized vessel 202 and/or heat shield 206, such that the distance between any point of thermal impingement and a sensor 214 may be below a threshold value. For example, pressurized vessel 202 may be configured with a number of sensors 214 distributed in a pattern such that no location on pressurized vessel 202 (and/or heat shield 206) is more than ten feet (or five feet, or four feet, or three feet, or two feet, or one foot) from a sensor 214. Moreover, it should be appreciated that sensors 214 may be arranged in any suitable manner to monitor temperatures near pressurized vessel 202 and/or heat shield 206.

Sensors 214 may be configured to measure a temperature at a location on and/or in pressurized vessel 202 and/or heat shield 206 and communicate a signal to ECM 216. More specifically, pressurized vessel 202 and/or heat shield 206 comprising materials having a high degree of thermal conductivity in the x-direction may conduct heat from any location along a length of pressurized vessel 202 and/or heat shield 206 toward sensors 214. For example, in the event a heat source such as a flame impinges on (and/or directs heat onto or into) any portion of pressurized vessel 202 and/or heat shield 206, heat may be conducted toward sensors 214 in the directions indicated by the arrows. The conducted heat may then be measured by sensors 214, which may transmit a signal to ECM 216 via signal paths 218 and/or 220. Upon detecting that a threshold temperature has been measured by sensors 214, ECM 216 may transmit a signal to one or more TPRDs 204 through signal paths 222 and 224 to relieve pressure in pressurized vessel 202. ECM 216 may further transmit a signal, such as a controller area network (CAN) signal, through signal path 226 to inform a vehicle operator and/or first responders of the temperature abnormality measured by sensors 214 to effectuate evacuation from the vehicle and/or direction and/or provision of maintenance or emergency services to the vehicle.

Figure 3A:
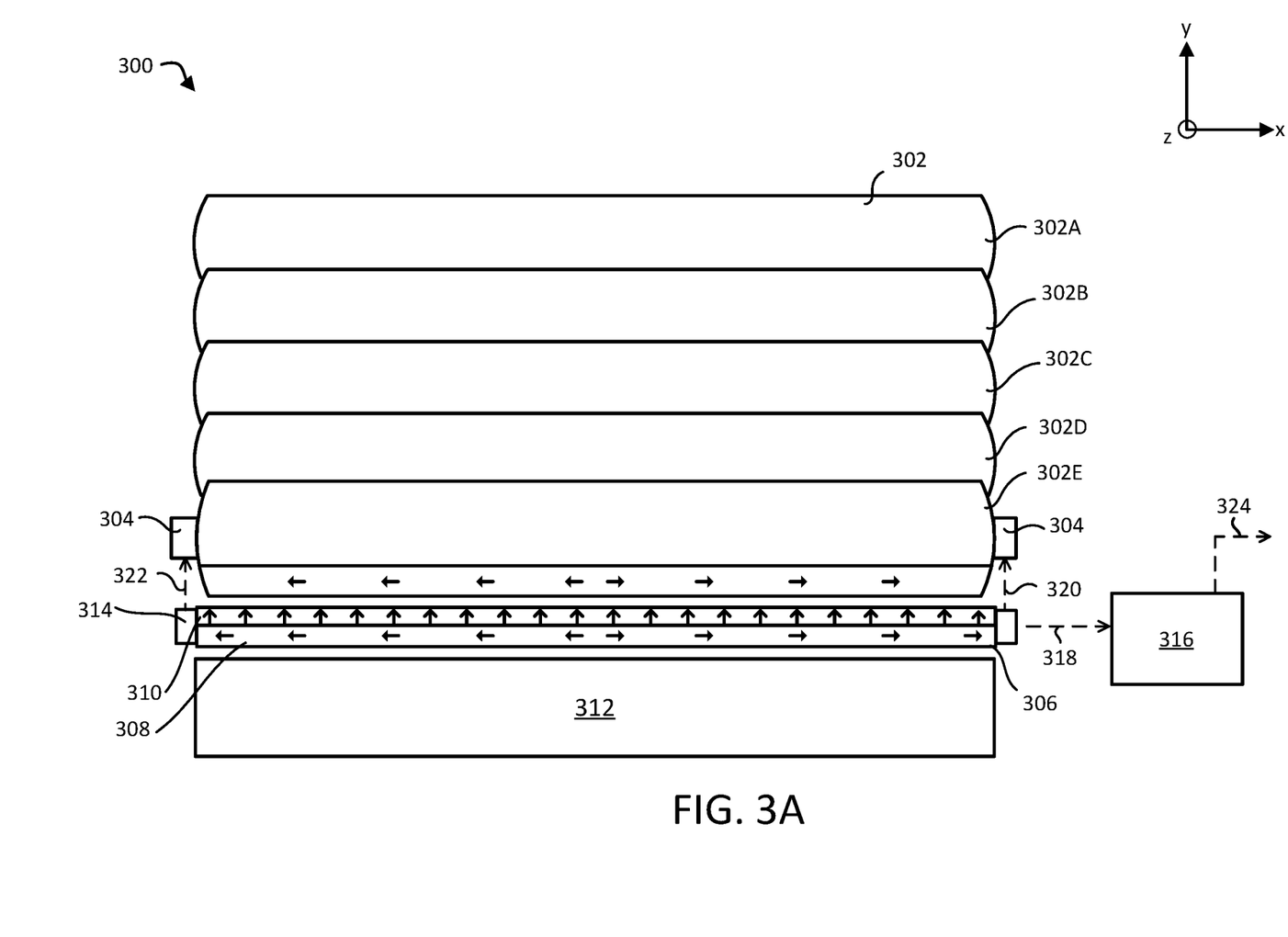
FIG. 3A illustrates a vessel heat shield and pressure relief system for a pressurized vessel system having multiple pressurized vessels, in accordance with various embodiments.

With reference now to FIG. 3A, a vessel heat shield and pressure relief system 300 for a pressurized vessel system having multiple pressurized vessels is illustrated in accordance with various embodiments. Vessel heat shield and pressure relief system 300 may comprise (and/or be suitable for use with) multiple pressurized vessels 302. For example, vessel heat shield and pressure relief system 300 may comprise a first pressurized vessel 302A, a second pressurized vessel 302B, a third pressurized vessel 302C, a fourth pressurized vessel 302D, and a fifth pressurized vessel 302E. In various embodiments, vessel heat shield and pressure relief system 300 may comprise more or fewer than five pressurized vessels 302. Further, while illustrated in FIG. 3A as being positioned adjacent to each other and substantially parallel, the pressurized vessels 302 in vessel heat shield and pressure relief system 300 are not limited in this regard and may be arranged in any suitable manner.

In various embodiments, vessel heat shield and pressure relief system 300 may be configured to detect a heat source such as a flame via a remote detection method and activate one or more TPRDs 304, such as an electrically-activated TPRD or a pilot-activated TPRD, similar to those discussed in relation to FIG. 1B and FIG. 1C. Specifically, vessel heat shield and pressure relief system 300 may comprise a heat shield 306 substantially parallel to and adjacent to at least one pressurized vessel 302. While illustrated as being situated substantially parallel and adjacent to pressurized vessel 302E, heat shield 306 is not limited in this regard. For example, it should be appreciated that heat shield 306 and pressurized vessels 302 may be oriented in any spatial relationship. For example, in various embodiments, heat shield 306 may completely encapsulate pressurized vessels 302 on all sides or surfaces to provide maximum protection to pressurized vessel 302. Moreover, heat shield 306 may comprise one or more individual heat shield components placed and/or disposed in a suitable manner in order to provide thermal shielding for one or more pressurized vessels 302.

In various embodiments, heat shield 306 may comprise a first layer 308 and a second layer 310 adjacent to the first layer 308. However, heat shield 306 is not limited in this regard and may comprise more layers or fewer layers; additionally, layers may be separated by air gaps, vacuum portions, and/or the like in order to provide a desired degree and/or configuration of thermal isolation and/or conduction. Heat shield 306 may comprise any suitable structure configured to provide a low degree of thermal conductivity in a first direction and a high degree of thermal conductivity in a second direction. Specifically, heat shield 306 may comprise a structure configured to provide low through-plane thermal conductivity and high in-plane thermal conductivity. For example, in various embodiments, heat shield 306 may be configured to provide a low degree of thermal conductivity in the y-direction yet a high degree of thermal conductivity in the x-direction. As such, heat shield 306 may be configured to conduct heat along a planar surface defined by heat shield 306 yet insulate at least one pressurized vessel 302 from thermal energy through heat shield 306. In various embodiments, heat shield 306 may be situated between a battery system 312 and at least one pressurized vessel 302. As will be discussed further below, in response to a flame or other heat source impinging on a surface of heat shield 306, heat shield 306 may be configured to conduct heat to one or more sensors 314, thereby signaling the need to relieve pressure from the pressurized vessels 302 through one or more TPRDs associated with valve(s) 304.

In various exemplary embodiments, heat shield 306 may comprise an anisotropic coating, layer, series of layers, or other suitable structure (such as strips of metal, carbon fiber, ceramics, and/or the like). All such exemplary materials, together with construction approaches for heat shield 306 whereby materials, coatings, sprays, layers, and/or the like are operative, either individually or in combination with one another, to provider greater thermal conductivity in a first direction (typically, an in-plane direction of heat shield 306) than in a second direction (typically, a through-plane direction for heat shield 306) are considered to be within the scope of the present disclosure. In various embodiments, heat shield 306 may further comprise one or more air gaps situated between the one or more coatings or layers. Air gaps may be configured to reduce convective heat transfer generated from the heat source impinging on heat shield 306. Therefore, heat shield 306 may be configured to insulate pressurized vessels 302 from thermal energy transferred by conduction as well as by convection.

In various embodiments, heat shield 306 may comprise any suitable material. For example, heat shield 306 may comprise a metallic base material such as a 300 series stainless steel or similar material. As previously stated, heat shield 306 may comprise a first layer 308 and a second layer 310. As such, in various embodiments, heat shield 306 may comprise a composite material with first layer 308 comprising a directional thermally conductive anisotropic coating or a deposited material such as copper, silver, or aluminum and second layer 310 comprising a non-organic, non-flammable, high-temperature, lightweight insulating material. First layer 308 may be configured to conduct heat along a surface of heat shield 306 in the x-direction, while second layer 310 may be configured to insulate pressurized vessels 302 from thermal energy through heat shield 306 in the y-direction. First layer 308 may comprise a coefficient of thermal conductivity of between approximately 100-400 W/m-K, between approximately 150-350 W/m-K, or between approximately 200-300 W/m-K. Second layer 310 may comprise a coefficient of thermal conductivity of between approximately 0-0.25 W/m-K, between approximately 0.05-0.20 W/m-K, or between approximately 0.10-0.15 W/m-K.

An exterior surface of pressurized vessels 302 may also comprise or be coated with one or more layers of an insulating and conductive material, in various embodiments. Similar to heat shield 306, pressurized vessels 302 may comprise or be coated with one or more layers of a material having a low degree of thermal conductivity in the y-direction and a high degree of thermal conductivity in the x-direction. Specifically, pressurized vessels 302 may be coated with an anisotropic thermal coating. As a result, pressurized vessels 302 may be configured to insulate contents of the pressurized vessels 302 from an external heat source and conduct such heat along a surface of pressurized vessels 302.

In various embodiments, pressurized vessels 302 and/or heat shield 306 may be equipped with one or more sensors 314 (which may comprise components similar to, and be utilized in a manner similar to, sensors 214). In various embodiments, sensors 314 may be coupled to pressurized vessels 302 and/or heat shield 306 at the terminal ends thereof, however, sensors 314 are not limited in this regard and may be coupled to any other portion of pressurized vessels 302 and/or heat shield 306. Further, while illustrated in FIG. 3A as comprising two sensors 314 associated with heat shield 306, vessel heat shield and pressure relief system 300 is not limited in this regard and may comprise any suitable number of sensors in any suitable location.

Sensors 314 may be configured to measure a temperature of heat shield 306 and communicate a signal to ECM 316. More specifically, heat shield 306 comprising materials having a high degree of thermal conductivity in the x-direction may conduct heat from any location along a length of heat shield 306 toward sensors 314. For example, in the event a heat source such as a flame impinges on any portion of heat shield 306, heat may be conducted toward sensors 314 in the directions indicated by the arrows. The conducted heat may then be measured by sensors 314, which may transmit a signal to ECM 316 via signal paths 318 and 320. Upon detecting that a threshold temperature has been measured by sensors 314, ECM 316 may transmit a signal, such as a controller area network (CAN) signal, through signal path 324 to inform a vehicle operator of the temperature abnormality measured by sensors 314. In various embodiments, sensors 314 may transmit a signal directly to one or more TPRDs 304 through signal paths 320 and 322 to relieve pressure in pressurized vessels 302.

First pressurized vessel 302A, second pressurized vessel 302B, third pressurized vessel 302C, fourth pressurized vessel 302D, and/or fifth pressurized vessel 302E may be linked such that a signal may be propagated between pressurized vessels 302 in the event one or more pressurized vessels 302 experiences a triggering event. For example, each pressurized vessel 302 of vessel heat shield and pressure relief system 300 may comprise one or more sensors 314 and/or one or more TPRDs 304. The sensors 314 and/or TPRDs 304 may be in communication via a wired or wireless connection, such that if pressure is relieved from any individual pressurized vessel 302, at least one other pressurized vessel 302 (or even every other pressurized vessel 302) also relieves at least a portion of its contents in order to relieve pressure. Such an arrangement can result in improved vehicle safety for first responders or service personnel in the event of a crash and/or service emergency resulting in a vehicle fire. In various embodiments, vessel heat shield and pressure relief system 300 may be configured such that pressure may be relieved from the individual pressurized vessels 302 simultaneously or in a prearranged sequence or path. For example, individual pressurized vessels 302 may discharge their contents at a rate and/or in an order configured to maintain a concentration of gaseous fuel in the air surrounding pressurized vessels 302 at or below a threshold level in order to reduce a chance for ignition of the venting gaseous fuel.

Figure 3B:
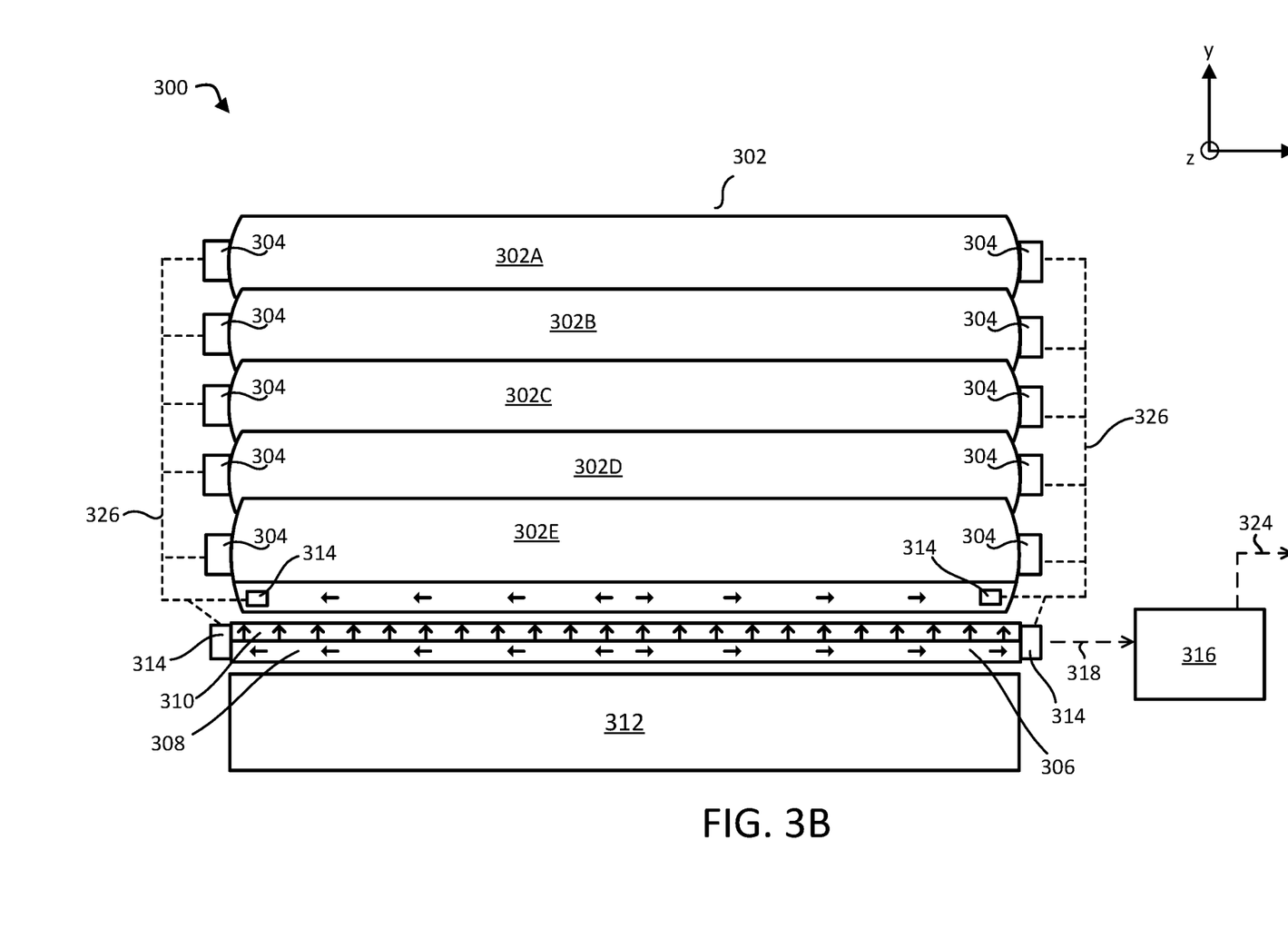
FIG. 3B illustrates a vessel heat shield and pressure relief system utilizing a thermal relay line, in accordance with various embodiments.

In various embodiments, and with reference to FIG. 3B, vessel heat shield and pressure relief system 300 may comprise a thermal relay or thermal switch that may be thermally triggered by the heat shield 306 comprising a composite assembly. For example, one or more thermal sensors 314 (on pressurized vessels 302 and/or heat shield 306) may be in close proximity to a thermal relay line 326. In various embodiments, the thermal relay line 326 may comprise a pyrotechnic core surrounded by one or more layers of plastic, fiberglass, or metal configured to achieve a desired signal transfer speed. In various embodiments, the thermal relay line 326 may be capable of transferring a signal at a rate of between 2,000 and 4,000 m/s. The thermal sensors 314 may be configured to activate (and/or combust) at a pre-determined temperature, for example, above 100° C., which, in turn, may ignite the thermal relay line 326. The thermal relay line 326 may transfer the signal directly to the TPRD) 304 causing the TPRD 304 to relieve pressure from the pressurized vessel(s) 302. While described herein as utilizing a thermal relay line comprising a pyrotechnic core, the thermal relay line 326 may propagate a signal directly to the TPRD(s) 304 via any suitable chemical reaction.

Additionally or alternatively, in the event a thermal relay or thermal switch is activated, pressure may be relieved via direct activation of a pilot-activated TPRD or an electrical signal sent to the ECM 316 to trigger the electrically-activated TPRD. Additionally or alternatively, a smart material or shape memory alloy may be used to trigger the TPRD by pilot operation due to a difference in length or strain of the shape memory alloy due to temperature change. Additionally or alternatively, one or more thermoelectric materials may be utilized which may create an electrical potential when the temperature at or near vessel heat shield and pressure relief system 300 changes significantly (otherwise known as the "Seebeck Effect"). The resulting electrical potential may directly trigger actuation of an electrically-actuated TPRD or send a signal to the ECM 316 which then may transmit a trigger signal to the electrically-actuated TPRD device. As such, various embodiments are contemplated that may cause pressure within one or more pressurized vessels 302 to be relieved in response to heat impinging on various portions of vessel heat shield and pressure relief system 300.

Figure 4:
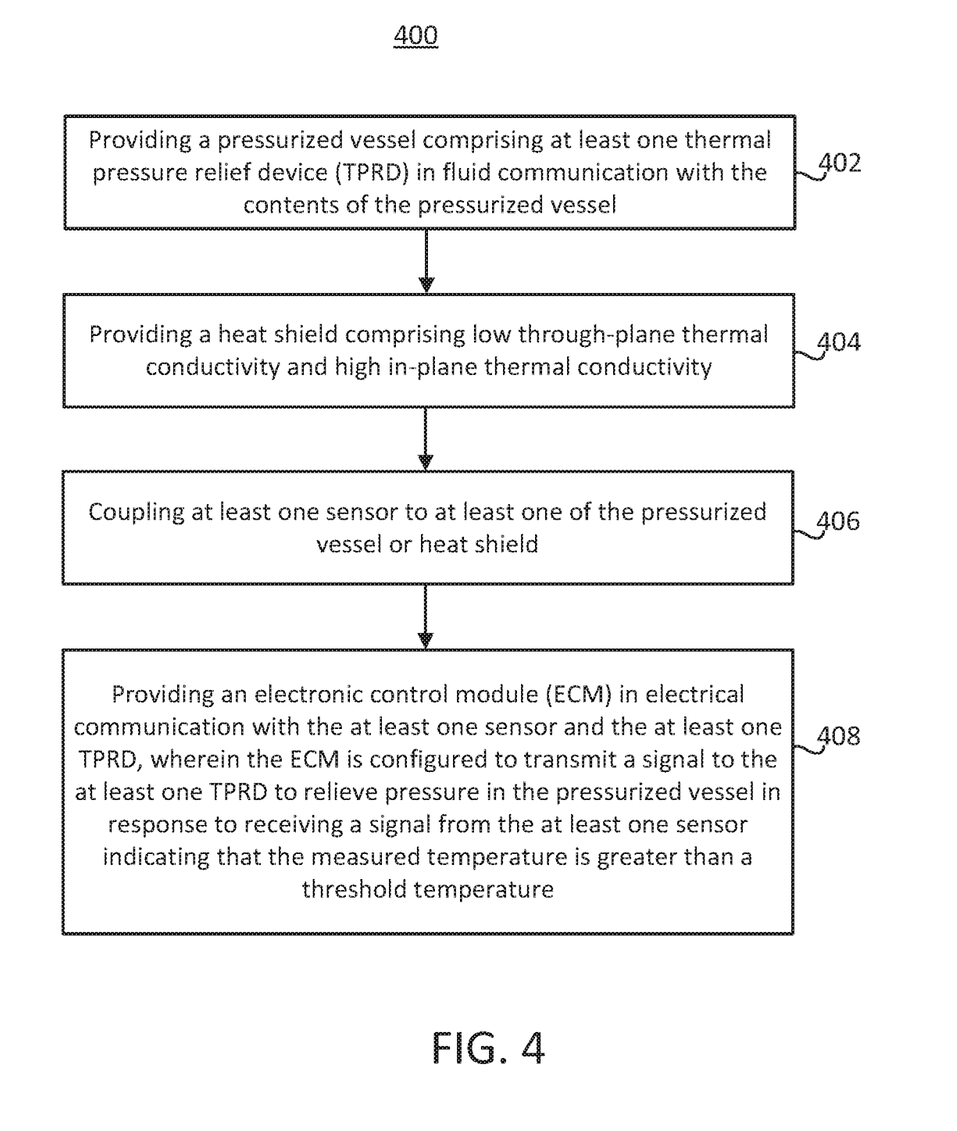
FIG. 4 illustrates a block diagram of a method of manufacturing a vessel heat shield and pressure relief system for a pressurized vessel, in accordance with various embodiments.

A block diagram illustrating a method of utilizing a vessel heat shield and pressure relief system is illustrated in FIG. 4, in accordance with various embodiments. The method 400 comprises providing a pressurized vessel comprising at least one thermal pressure relief device (TPRD) in fluid communication with the contents of the pressurized vessel (step 402). The method further comprises providing a heat shield comprising low through-plane thermal conductivity and high in-plane thermal conductivity (step 404). The method further comprises coupling at least one sensor to at least one of the pressurized vessel or heat shield (step 406). The method further comprises providing an electronic control module (ECM) in electrical communication with the at least one sensor and the at least one TPRD, wherein the ECM is configured to transmit a signal to the at least one TPRD to relieve pressure in the pressurized vessel in response to receiving a signal from the at least one sensor indicating that the measured temperature is greater than a threshold temperature (step 408).

Figure 5:
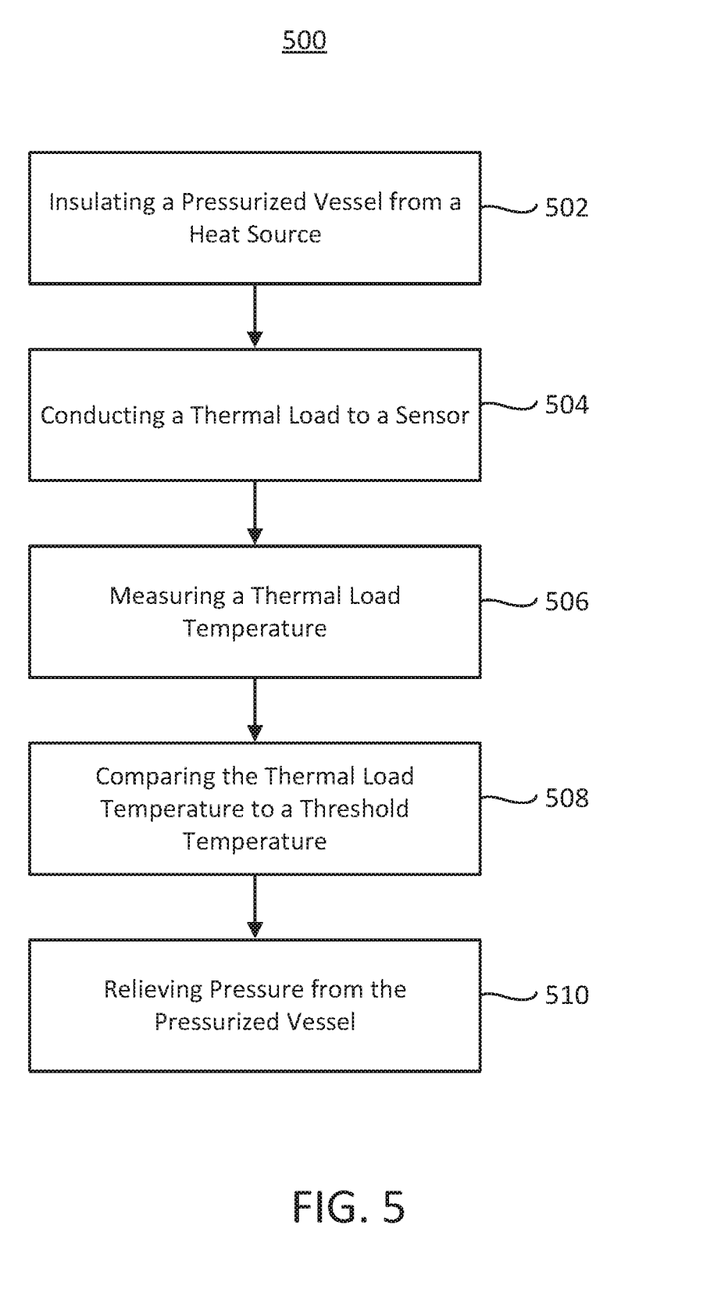
FIG. 5 illustrates a block diagram of a method of relieving pressure from a pressurized vessel, in accordance with various embodiments.

With reference now to FIG. 5, a method 500 of relieving pressure from a pressurized vessel is illustrated in accordance with various embodiments. Method 500 may comprise insulating a pressurized vessel from a heat source (step 502). In various embodiments, the heat source may be generated internal to the vehicle (e.g., a high voltage battery) or external to the vehicle. The pressurized vessel may comprise a vessel similar to that described with reference to FIG. 1A, FIG. 2, FIG. 3A, FIG. 3B, or the like. Step 502 may include insulating the pressurized vessel using a heat shield (for example, similar to heat shield 206 and/or heat shield 306), or through the use of a coating or material applied directly to the pressurized vessel. In various embodiments and as described previously, the materials and structure associated with the heat shield and/or pressurized vessel may comprise a relatively low through-plane thermal conductivity, thereby reducing the thermal energy imparted to the pressurized vessel. Insulating the pressurized vessel may limit temperature and pressure increases within the pressurized vessel, thereby reducing the likelihood of structural failure (e.g., rupture) of the pressurized vessel.

Method 500 may further comprise conducting a thermal load to a sensor (step 504). In various embodiments, the thermal load may be generated by the heat source. In addition to having a low through-plane thermal conductivity, the heat shield and/or pressurized vessel may also comprise a material and/or structure having a high in-plane thermal conductivity. As a result, at least a portion of the thermal load may be conducted through the heat shield and/or pressurized vessel to one or more sensors coupled to (and in electrical communication) with the heat shield and/or pressurized vessel. In various embodiments, as previously stated, the sensor may comprise a temperature sensor such as a mechanical temperature sensor (for example, thermometer or bimetallic strip) or an electrical temperature sensor (for example, thermocouple, thermistor, resistance thermometer, silicon bandgap temperature sensor, or the like).

Method 500 may further comprise measuring a thermal load temperature (step 506). In various embodiments, after conducting a thermal load to the sensor, the sensor may determine and measure the thermal load temperature. In various embodiments, the thermal load temperature may be communicated to an ECM or other electronic control unit for further processing. In various embodiments, method 500 may further comprise comparing the thermal load temperature to a threshold temperature (step 508). The ECM in electrical communication with the one or more sensors may compare the thermal load temperature to a pre-determined threshold temperature, which may be calculated, determined, set, and/or selected based at least in part on information pertaining to the pressurized vessel. For example, the threshold temperature may be pre-determined based on a calculated pressure value which may be compared against a pressure rating of the pressurized vessel.

Method 500 may further comprise relieving pressure from the pressurized vessel (step 510). For example, in the event the thermal load temperature is greater than the threshold temperature, this may signal the need to reduce pressure in the pressurized vessel as the increase in temperature may have resulted in a corresponding increase in pressure in the pressurized vessel. In response, the ECM may deliver a signal to one or more TPRDs associated with the pressurized vessel to relieve pressure in the pressurized vessel by opening one or more relief ports. In the event the thermal load temperature is determined to be less than the predetermined threshold temperature, the ECM may continue to monitor the thermal load temperature and/or notify the operator of deviations of temperature from normal values or ranges of values.

Additionally or alternatively, pressure may be relieved from the pressurized vessel passively rather than through signals sent by the ECM or other electronic control unit. For example, a smart material or shape memory alloy may be used to trigger the TPRD by pilot operation due to a difference in length or strain of the shape memory alloy due to temperature change. Additionally or alternatively, one or more thermoelectric materials may be utilized which may create an electrical potential when the temperature at or near the heat shield or pressurized vessel changes significantly. The resulting electrical potential may directly trigger actuation of an electrically-activated TPRD. Additionally or alternatively, a thermal relay line may deliver a thermal signal to vent pressure from the pressurized vessel. Moreover, in method 500 any suitable technique(s) and/or components may be utilized to sense a thermal load and/or generate or deliver a signal to vent pressure from a pressurized vessel.

Finally, it should be appreciated that while method 500 is described as monitoring and/or measuring temperatures associated with the heat shield and/or pressurized vessel, it should be appreciated that the principles disclosed herein could equally apply to other variables impacting safety and performance of the pressurized vessel such as pressure. For example, one or more pressure meters or pressure gauges may be coupled directly to the pressurized vessel to identify fluctuations in the pressurized value outside a normal value or range of values. Pressure outside a normal value or range of values may be indicative of an increase in temperature of the pressurized vessel or other reasons such as over fueling of the pressurized vessel. In this regard, the pressure meters or pressure gauges may deliver a signal to the ECM which may in turn signal to the TPRD to relieve pressure in the pressurized vessel. Numerous embodiments are contemplated in this regard.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and articles are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pressure relief system, comprising:
    a first pressurized vessel containing a first amount of a fuel and comprising a first thermal pressure relief device;
    a second pressurized vessel containing a second amount of the fuel and comprising a second thermal pressure relief device;
    a heat shield positioned substantially parallel to the first pressurized vessel, wherein the heat shield extends a length of the first pressurized vessel and separates the first pressurized vessel from a battery system in order to limit thermal energy transfer from the battery system to the first pressurized vessel; and
    a sensor coupled to at least one of the first pressurized vessel or the heat shield;
    wherein at least one of the first pressurized vessel or the heat shield comprise a material having a through-plane thermal conductivity lower than an in-plane thermal conductivity,
    wherein the material is configured to conduct heat to the sensor,
    wherein the sensor is in communication with the first thermal pressure relief device via a thermal relay line,
    wherein the sensor combusts at a predetermined temperature,
    wherein, in response to the sensor combusting at the predetermined temperature, the first thermal pressure relief device is activated via a signal transferred from the sensor to the first thermal pressure relief device by the thermal relay line,
    wherein, in response to the first thermal pressure relief device being activated, the first pressurized vessel releases at least a portion of the first amount of the fuel, and
    wherein the first thermal pressure relief device and the second thermal pressure relief device are in communication via a wired or wireless connection such that, in response to the first pressurized vessel releasing the portion of the first amount of the fuel, the second pressurized vessel releases at least a portion of the second amount of the fuel.

2. The pressure relief system of claim 1, wherein the heat shield comprises a first layer configured to conduct thermal energy in a direction corresponding to a length of the heat shield.

3. The pressure relief system of claim 2, wherein the heat shield further comprises a second layer configured to reduce thermal energy transfer in a direction normal to the length of the heat shield.

4. The pressure relief system of claim 3, wherein the first layer comprises a material different from a material of the second layer.

5. The pressure relief system of claim 1, further comprising a third pressurized vessel in proximity to the second pressurized vessel.

6. The pressure relief system of claim 1, wherein the sensor comprises a plurality of temperature sensors, and wherein the plurality of temperature sensors are disposed on the first pressurized vessel and the heat shield such that no location on the first pressurized vessel or the heat shield is more than a specified distance from one of the plurality of temperature sensors.

7. The pressure relief system of claim 1, wherein the signal of the thermal relay line travels at a rate of between 2,000 and 4,000 m/s.

8. The pressure relief system of claim 1, wherein the predetermined temperature is 100° C.

9. The pressure relief system of claim 1, wherein the heat shield comprises the material and the sensor is coupled to the heat shield.

10. The pressure relief system of claim 1, wherein the heat shield comprises the material and the first pressurized vessel and the second pressurized vessel are coated with the material.

\* \* \* \* \*